(No Model.)

M. A. MAUS.
LOCK NUT FOR PIPE COUPLINGS.

No. 288,250.  Patented Nov. 13, 1883.

WITNESSES.
Jacob W. Loeper
Chas. T. Spritz

INVENTOR.
Mathias A. Maus
By C. P. Jacobs, Atty.

UNITED STATES PATENT OFFICE.

MATHIAS A. MAUS, OF INDIANAPOLIS, INDIANA.

LOCK-NUT FOR PIPE-COUPLINGS.

SPECIFICATION forming part of Letters Patent No. 288,250, dated November 13, 1883.

Application filed December 11, 1882. (No model.)

*To all whom it may concern:*

Be it known that I, MATHIAS A. MAUS, of Indianapolis, Indiana, have invented a new and useful Improvement in Lock-Nuts for Pipe-Coupling Joints, of which the following is a description, reference being made to the accompanying drawings, in the several figures of which like letters indicate like parts.

My invention consists of a lock-nut which works upon the threaded end of the pipe and toward the coupling, the side of the nut toward the coupling being recessed to receive the end of the coupling and to hold a washer or packing, so that by tightening the nut the joint of the pipe and coupling is made close enough to prevent the escape of fluids or gases at any temperature.

Figure 1:
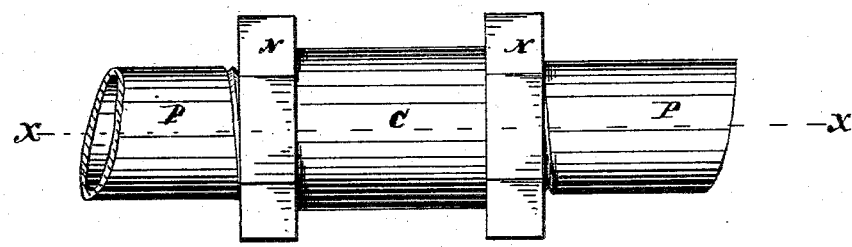
Figure 2:
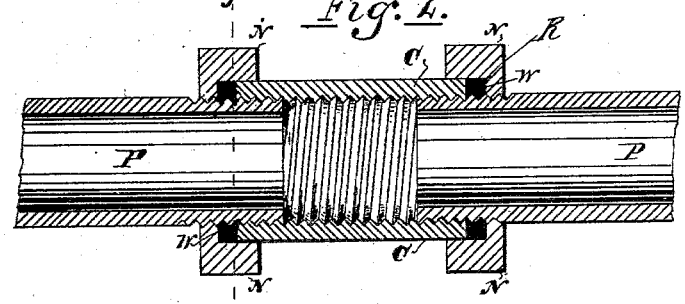
Figure 3:
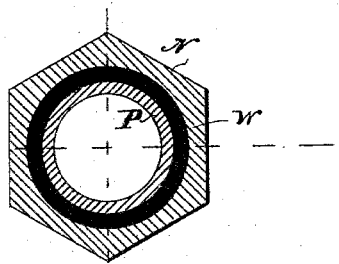

In the drawings, Figure 1 represents a perspective view of my device, showing the pipes in either end of the coupling and the lock-nuts in place. Fig. 2 represents a longitudinal section of the same along the line $x\,x$, Fig. 1. Fig. 3 represents a cross-section of the lock-nut along the line $y\,y$, Fig. 2.

In the drawings, P represents the pipe; C, the coupling; N, the lock-nut, having recess R and containing a washer, W. The washer fills up the recess.

The operation of my device is simple and easily understood. The lock-nut is screwed upon and past the end of the pipe P, and the end of the latter is screwed into the end of the coupling C as tight as is desired. The nut is then turned, so as to bring the face of the washer in the recessed face of the nut against the end of the coupling C, and tightened with a wrench. The nut being thus tightened, the washer, preferably made of elastic material, will close up any openings in the joint where the pipe is screwed into the coupling, and at any time, by a turn of the wrench, may be tightened and a leak stopped. This advantage over other forms of devices for tightening joints of this kind is especially noticeable when the device is applied to joints in pipes for ammonia refrigerating-machines. In these and kindred machines the intense cold opens the joints by contracting the iron, and allows the vapor-gas to escape, which may be quickly remedied by the use of my lock-nut.

I am aware that clamps having recessed faces to inclose washers have been used to tighten joints; but these have been brought together by bolts or appliances separate and independent from the clamp, but am not aware that any device similar to my invention has been before known or used.

What I claim, and desire to secure by Letters Patent, is the following:

1. In a pipe-coupling joint, the recessed lock-nut N, which works upon a thread formed on the outside of the pipe P, and adapted, when tightened, to abut against the end of the coupling-pipe C, in combination with pipes P and C and washer W, substantially as described.

2. In a pipe-coupling joint, the combination of an ordinary coupling threaded at each end to receive the ends of the pipe, with the pipe and a recessed lock-nut, which works upon a thread formed on the exterior of the pipe and outside the coupling, the recess adapted to fit over the end of the latter, and containing a washer, which, upon tightening the nut, closes the joint around the pipe where it enters the coupling, substantially as described.

In witness whereof I have hereunto set my hand this 7th day of December, 1882.

MATHIAS A. MAUS.

Witnesses:
C. P. JACOBS,
CHARLES J. RAUTH.